(12) United States Patent
Khan et al.

(10) Patent No.: US 11,287,250 B2
(45) Date of Patent: Mar. 29, 2022

(54) GRADING TOOL FOR MEASURING A ROCKER ARM AND ROCKER ARM GRADING SYSTEM

(71) Applicant: Eaton Intelligent Power Limited, Dublin (IE)

(72) Inventors: Shahnawaz Ahmed Khan, Pune (IN); Sandeep Kumar, Pune (IN); Guruprasath Alagarsamy, Tamil Nadu (IN)

(73) Assignee: Eaton Intelligent Power Limited, Dublin (IE)

( * ) Notice: Subject to any disclaimer, the term of this patent is extended or adjusted under 35 U.S.C. 154(b) by 11 days.

(21) Appl. No.: 17/007,367

(22) Filed: Aug. 31, 2020

(65) Prior Publication Data

US 2021/0063145 A1 Mar. 4, 2021

(30) Foreign Application Priority Data

Aug. 30, 2019 (IN) .............................. 201911035098

(51) Int. Cl.
*G01B 11/255* (2006.01)
*F01L 1/18* (2006.01)
(52) U.S. Cl.
CPC .............. *G01B 11/255* (2013.01); *F01L 1/18* (2013.01)
(58) Field of Classification Search
CPC ....... G01B 11/255; G01B 11/02; G01B 11/08; F01L 1/18; F01L 2001/186; F01L 1/185; F01L 2303/01; F01L 2305/00; F01L 2800/09; F01L 2820/01; F01L 13/0063; F02B 77/083

See application file for complete search history.

(56) References Cited

U.S. PATENT DOCUMENTS

| 3,363,963 | A | * | 1/1968 | Riedl | ..................... | G01B 11/00 |
|---|---|---|---|---|---|---|
| | | | | | | 359/438 |
| 9,822,673 | B2 | * | 11/2017 | Spoor | ..................... | B23P 19/02 |
| 10,337,360 | B2 | | 7/2019 | Zurface | | |
| 2013/0024154 | A1 | * | 1/2013 | Lyon | ..................... | F16D 51/00 |
| | | | | | | 702/150 |

(Continued)

FOREIGN PATENT DOCUMENTS

CN 208567687 U 3/2019
CN 214308548 U * 2/2021

(Continued)

*Primary Examiner* — Joseph J Dallo
*Assistant Examiner* — Kurt Philip Liethen
(74) *Attorney, Agent, or Firm* — Mei & Mark, LLP (57) ABSTRACT

A rocker arm grading system can comprise a grading tool. The grading tool can be used with a rocker arm to measure aspects of the rocker arm and determine a resulting valve lift. The grading tool can comprise a rocker arm jig comprising a pivot peg and a valve peg. A cam jig can comprise a cam arm. A cam pin can be mounted in the cam arm. A rocker arm can be removably mounted to the rocker arm jig. The rocker arm can comprise a radius on a bearing surface. A cam edge of the cam pin can press against the bearing surface. At least one measuring device comprising a wavelength emitting device paired with a wavelength detecting device can be configured to measure the radius of the bearing surface with respect to the pivot peg.

20 Claims, 9 Drawing Sheets

(56) References Cited

U.S. PATENT DOCUMENTS

| | | | | |
|---|---|---|---|---|
| 2014/0290609 A1* | 10/2014 | Radhakrishnan | ......... | F01L 1/18 |
| | | | | 123/90.45 |
| 2016/0273413 A1* | 9/2016 | Sheren | ................ | B21D 53/84 |
| 2017/0363511 A1* | 12/2017 | Dudek | .................. | F01L 1/34 |
| 2021/0258458 A1* | 8/2021 | Iijima | .................. | H04N 5/2256 |

FOREIGN PATENT DOCUMENTS

| | | |
|---|---|---|
| DE | 102013205533 A1 | 10/2014 |
| GB | 2082718 A | 3/1982 |
| JP | 2008705613 A | 4/2008 |

* cited by examiner

GRADING TOOL FOR MEASURING A ROCKER ARM AND ROCKER ARM GRADING SYSTEM

PRIORITY

This application claims the benefit of priority to and incorporates by reference in the entirety Indian provisional patent application 201911035098 filed Aug. 30, 2019.

FIELD

This application provides a grading tool for measuring and sorting rocker arm assemblies to reduce lift variations.

BACKGROUND

Roller rocker arms are subject to tolerance stack up. Techniques such as more precise manufacturing and machining can reduce variation in the roller rocker arm, but these techniques can be expensive and can result in high scrap volume.

SUMMARY

The devices disclosed herein overcome the above disadvantages and improves the art by way of a rocker arm grading system that can comprise a grading tool. The grading tool can be used with a rocker arm to measure aspects of the rocker arm and determine a resulting valve lift. The grading tool can comprise a rocker arm jig comprising a pivot peg and a valve peg. A cam jig can comprise a cam arm. A cam pin can be mounted in the cam arm. A rocker arm can be removably mounted to the rocker arm jig. The rocker arm can comprise a radius on a bearing surface. A cam edge of the cam pin can press against the bearing surface. At least one measuring device comprising a wavelength emitting device paired with a wavelength detecting device can be configured to measure the radius of the bearing surface with respect to the pivot peg.

As an alternative, the above rocker arm grading system and grading tool can further comprise a weight affixed to the cam pin to press the cam edge towards the pivot peg and the valve peg.

As an alternative, the above rocker arm grading system and grading tool can further comprise a rim positioned above the cam arm on the cam pin. A guide arm can be configured to guide the cam pin. The guide arm can comprise a biasing surface. A spring can be biased between the biasing surface and the rim to press the cam edge towards the pivot peg and the valve peg.

As an alternative, the above rocker arm grading system and grading tool can further comprise a handle configured to move the cam pin.

As an alternative, the above rocker arm grading system can further comprise a radius on a bearing surface. The radius can be formed by a bearing on a bearing axle. The bearing can be a roller bearing.

As an alternative, the above rocker arm grading system and grading tool can further comprise the measuring device configured to measure the radius of the bearing surface with respect to the pivot peg.

As an alternative, the above rocker arm grading system and grading tool can further comprise a reference peg installed in the rocker arm jig between the pivot peg and the valve peg.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

DETAILED DESCRIPTION

Reference will now be made in detail to the examples which are illustrated in the accompanying drawings. Wherever possible, the same reference numbers will be used throughout the drawings to refer to the same or like parts.

Disclosed is an arrangement of a grading tool and rocker arm grading system which can be used to measure a roller rocker arm ("RRA") assembly bearing roller position precisely. This measurement helps to sort the rocker arms in grades such that when the same grade rocker arms are assembled in an engine, the valve lift variation between different valves of either the intake side valves or the exhaust side valves of the same engine will be much lower. The grade sizes are selected based on customer requirements and a mathematical transfer function of the engine layout. The mathematical transfer function converts the roller rocker arm roller position variation to valve lift variation so that the valve lift variation is controlled by the roller position variation.

Figure 4:
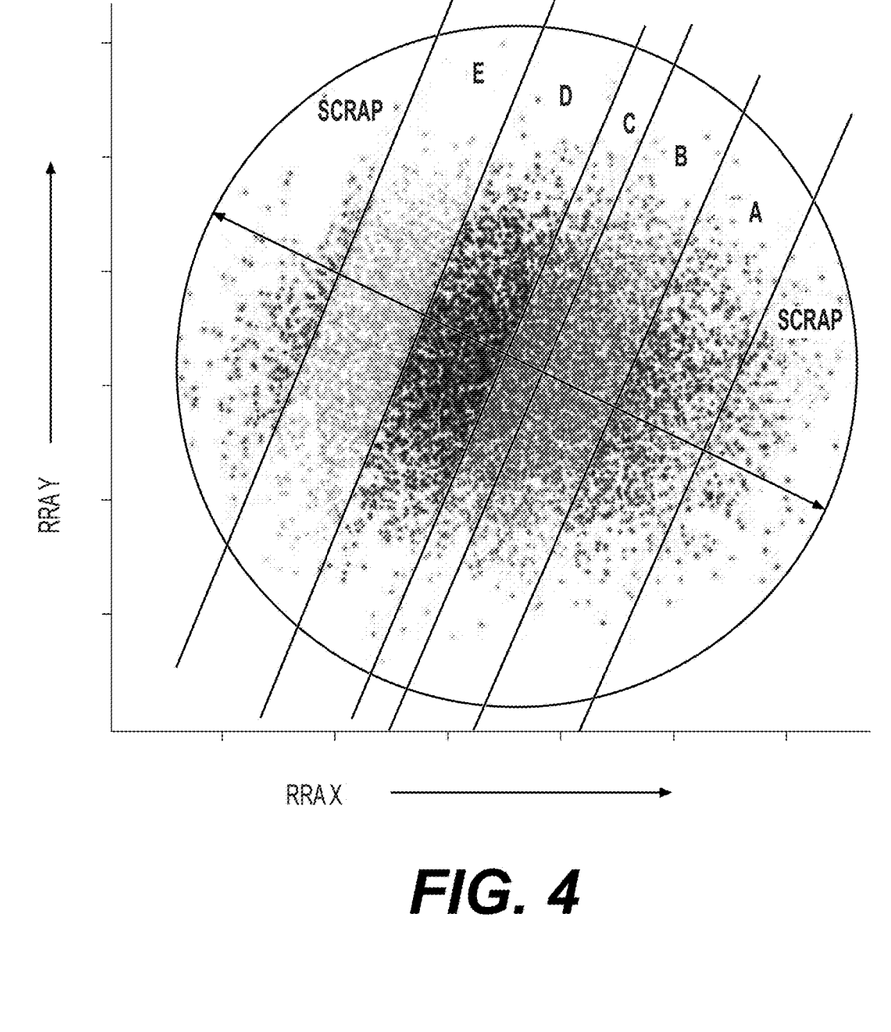
FIG. 4 is an explanation of rocker arm grading.

For example, in FIG. 4, measuring device can be used to collect rocker arm measurements relative to the grading tool and the rocker arm in the rocker arm grading system. The measurements can be correlated to acceptable values, or grades A-E. Outside of these grades, the rocker arm is scrapped.

Figure 3:
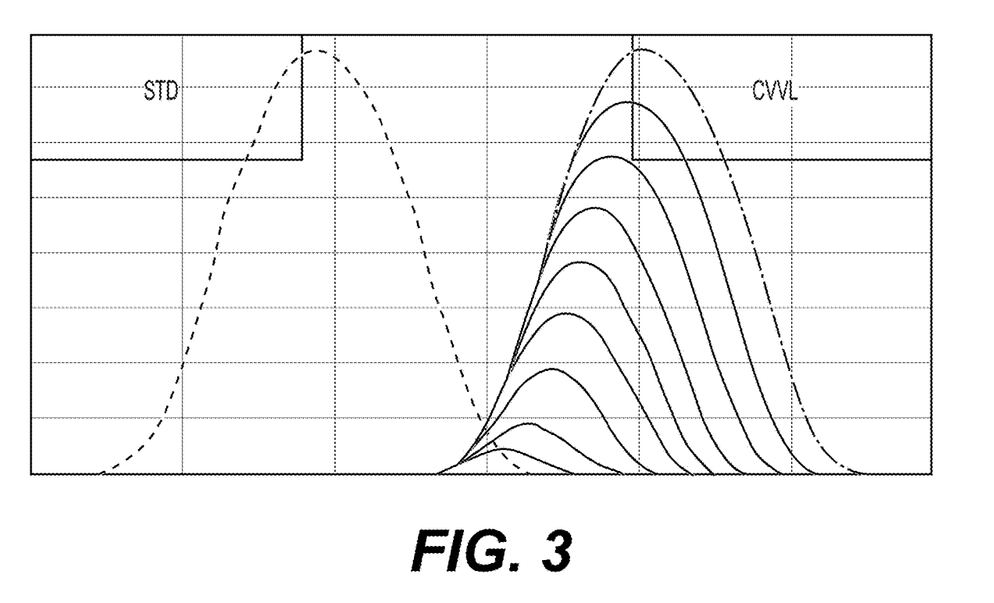
FIG. 3 is an explanation of valve lift profiles.

As described in FIG. 3, there is a need for rocker arm grading. Valve lift profiles have become more and more sophisticated. Engines can offer valve lift profiles from a standard lift STD shown on the left to a variety of variable valve lift profiles (CVVL) on the right side of FIG. 3. The variable valve lift profiles can be correlated to a combustion technique. Rocker arm compatible with the grading tool and rocker arm grading system can even switch between lift profiles, as by actuating a latch pin in the rocker arm or as by cam actuation, among other ways to vary the valve lift.

Figure 2:
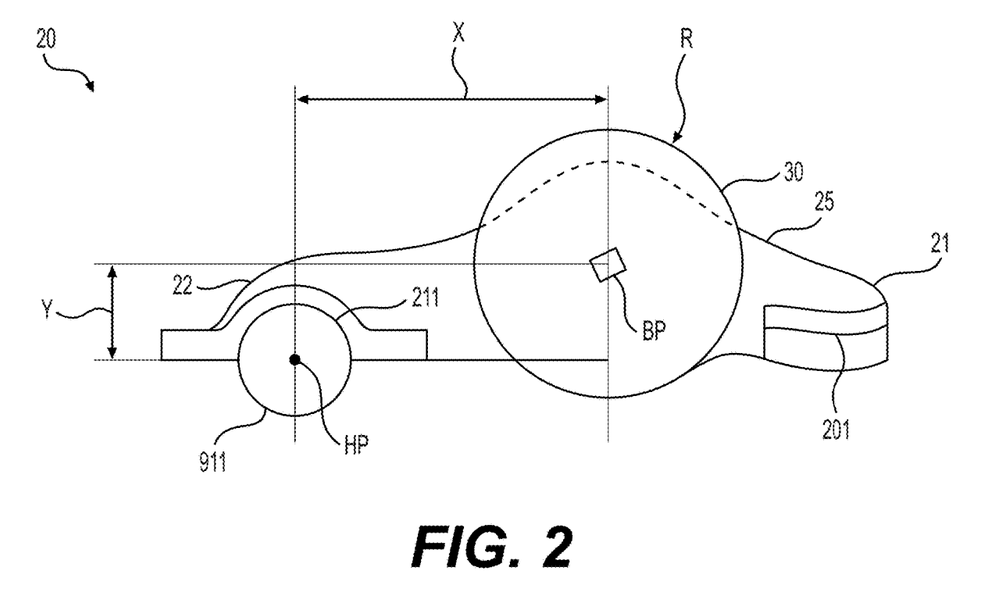
FIG. 2 is an explanatory view of a rocker arm compatible with the rocker arm grading system and the rocker arm grading tool.

Precise control of the roller rocker arm assembly roller positional tolerance can be achieved, for example up to Ø 0.02 mm. Roller position, or other bearing surface, plays a vital role in valve lift. FIG. 2 shows the bearing surface of a roller bearing 30 having radius R. The roller bearing 30 can be mounted on an axle centered at bearing point BP. A pivot end 22 of the rocker arm 20 can comprise a socket 211 for seating against a mechanical or hydraulic lash adjuster or other pivot point in the engine. When an overhead cam actuates on the roller bearing 30, the rocker arm 20 pivots via the socket 211 and the valve end 21 tilts to actuate a valve seated against valve seat 201. Numerous alternative rocker arms exist in the art, including those with lost motion springs, inner and outer arm pairings, deactivating mechanisms, latches, among others. By selecting the relationship between the bearing surface and the pivot location, the valve lift can be controlled. So, selecting a rocker ratio of a roller rocker arm ("RRA") and applying a cam actuation profile having a select cam lift, a user can select the height and duration of valve lift such as those examples shown in FIG. 3 and as shown in equation 1.

(valve lift=cam lift×rocker ratio of RRA)      eq.1

The variation in roller position causes variation in the valve lift between different valves of different cylinders within the same engine for either intake side valves or exhaust side valves. In an example engine, a maximum valve lift is approximately 10 mm. A lift variation of approximately ±0.3 mm can be seen due to tolerances of valvetrain components in the engine. This variation can be reduced using the grading tool herein. The grading tool is chosen because the rocker arm roller bearing position can have the greatest contribution to the lift variation. When using certain variable valve lift techniques, such as CVVL (Continuously Variable Valve Lift), the system can go to as low as 1 mm valve lift at low speeds as per engine demand. A lift variation of ±0.3 mm between different valves at such low lifts of 1 mm can cause significant difference in torque generation between different cylinders which may result in unstable idling, crank vibrations, and undesired engine heating.

A method of manufacturing the roller rocker arm 20 by a stamping process through body 25 yields an axle hole positional accuracy of ø 0.3 mm which further drives the bearing roller position assembled on the bearing axle that is inserted in the axle hole of the roller rocker arm RRA. To get precision of the bearing roller position at bearing point BP, the grading tool is used. Measuring the RRAs and sorting the RRAs into 5 grades to meet customer requirements of low variation in valve lift avoids adding other expensive manufacturing processes to the RRAs which creates a cost and materials savings. For example, the bearing point BP can vary within a range shown in FIG. 5. Instead of scrapping all of these deviations, it is possible to account for the deviation and sort the rocker arms 20 into one of the grades A-E. Then, the sorted rocker arms can be matched to an appropriate variable valve lift technique. Or, matching grades of rocker arms can be used in a single engine installation to give consistent idling, crank vibration, and heating. Then, NVH compensation systems can be tuned accordingly.

FIG. 2 illustrates a relationship between the center point of socket 211, which can correspond to pivot point HP of a pivot knurl 911 of pivot peg 910. A first distance X between the pivot point HP and the bearing point BP can be determined by processing data collected by one or both measuring device 41, 42. A second distance Y between the pivot point HP and the bearing point BP can be determined by processing data collected by one or both measuring device 41, 42. The first distance X and the second distance Y can be derived by knowing certain constants and relationships. For example, measuring the curvature of a perimeter portion of the roller bearing 30 can yield the radius of a cylindrical bearing. Other bearing surfaces can be said to be radiused. By having certain relationships known, it is possible to calculate bearing point BP with accuracy by measuring the radius of the radiused bearing surface.

By measuring first distance X, second distance Y, and radius R, their effect on valve lift grades can be simulated, as by Monte Carlo or other transfer function, and customer impacts can be known. Appropriate standards of deviation can be applied for the grades. Iterations of measurements can be collected quickly by using a KEYENCE laser measurement tool as the measuring devices 41, 42. Then, a left and right hand side of the rocker arm 20 can be measured or remeasured to ensure first distance X, second distance Y, and radius R are accurately collected. Left and right hand sides of the rocker arm 20 can have different bearing points BP due to the stamping or other machining process used to make a bearing axle hole in body 25. Detecting and avoiding this type of deviation of left hand and right hand radius R can prevent twisting of the roller bearing 30 relative to the overhead cam during use, this twisting being undesired during engine operation. So, while it is possible to use only one measuring device 41, 42, it is beneficial to have a left hand, or first, measuring device 41 and a right hand, or second, measuring device 42.

Figure 1A:
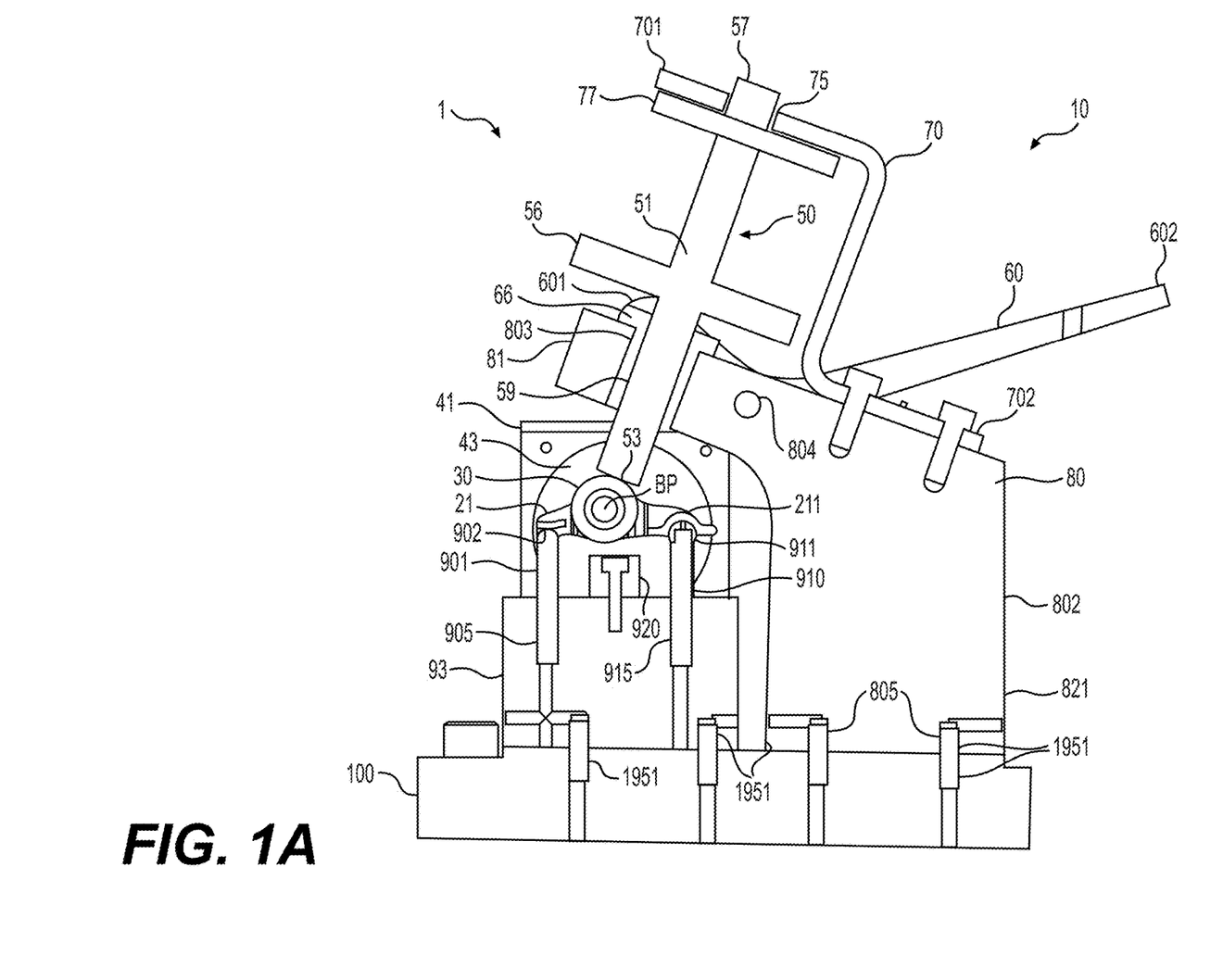
FIGS. 1A & 1B are views of alternative rocker arm grading systems comprising alternative grading tools.
Figure 1B:
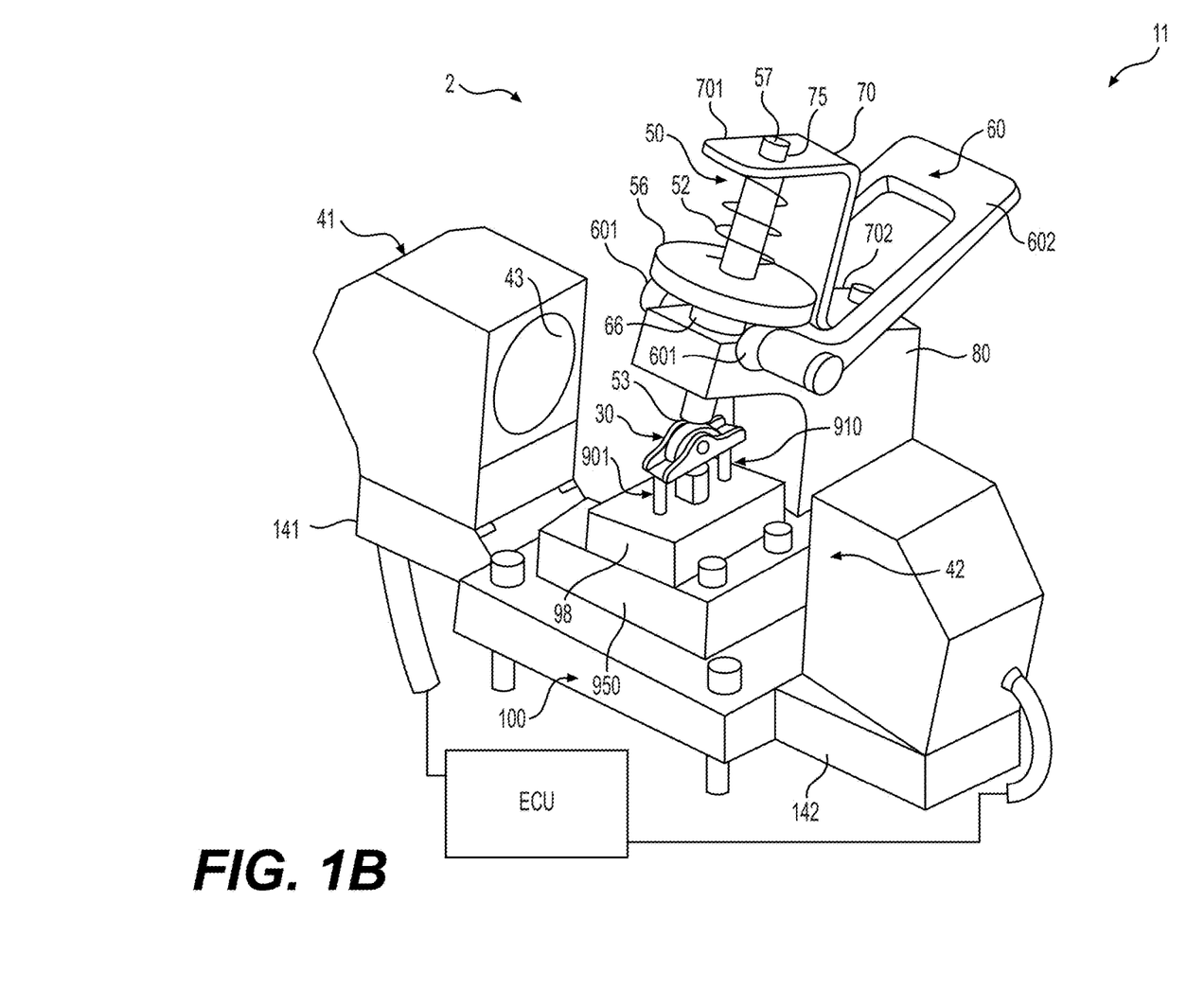

FIGS. 1A & 1B show alternative grading tool assemblies 10, 11. The grading tool assemblies can measure the position of a roller bearing in terms of first distance X & second distance Y with respect to pivot point HP and radius R of the bearing surface 30 of roller bearing and yield a digital output in the ECU.

A rocker arm grading system 1, 2 can comprise a grading tool 10, 11. The grading tool 10, 11 can be used with a rocker arm 20 to measure aspects of the rocker arm 20 and determine a resulting valve lift. The grading tool 10, 11 can comprise a rocker arm jig 90, 93 comprising a pivot peg 910 and a valve peg 901. Valve peg 901 can comprise a valve width VW and upper edge 902 so that the rocker arm 20 valve seat 201 can rest on the valve peg 901. A valve axis V can become a constant in the calculations for determining valve lift of a given rocker arm 20. Valve peg 901 can be removable or exchangeable in a dowel port 905 of the rocker arm jig 90, 93. Pivot peg 910 can likewise be removed or exchanged in dowel port 915. Different rocker arms can be graded using the same rocker arm jig, grading tool, and rocker arm grading system 1, 2. Pivot peg 910 can yield a pivot axis H, a pivot point height HH relative to the base height BH of the rocker arm jig 90, 93, a pivot axle width HW, and pivot knurl height LH. A known distance N can be set between the pivot peg 910 and the valve peg 901. These can also form constants in the valve lift determination. Pivot knurl 911 can be designed to let socket 211 move slightly without stiction. A flat 912 can be formed on pivot knurl 911 to assist with removability of the rocker arm 20.

Figure 8:
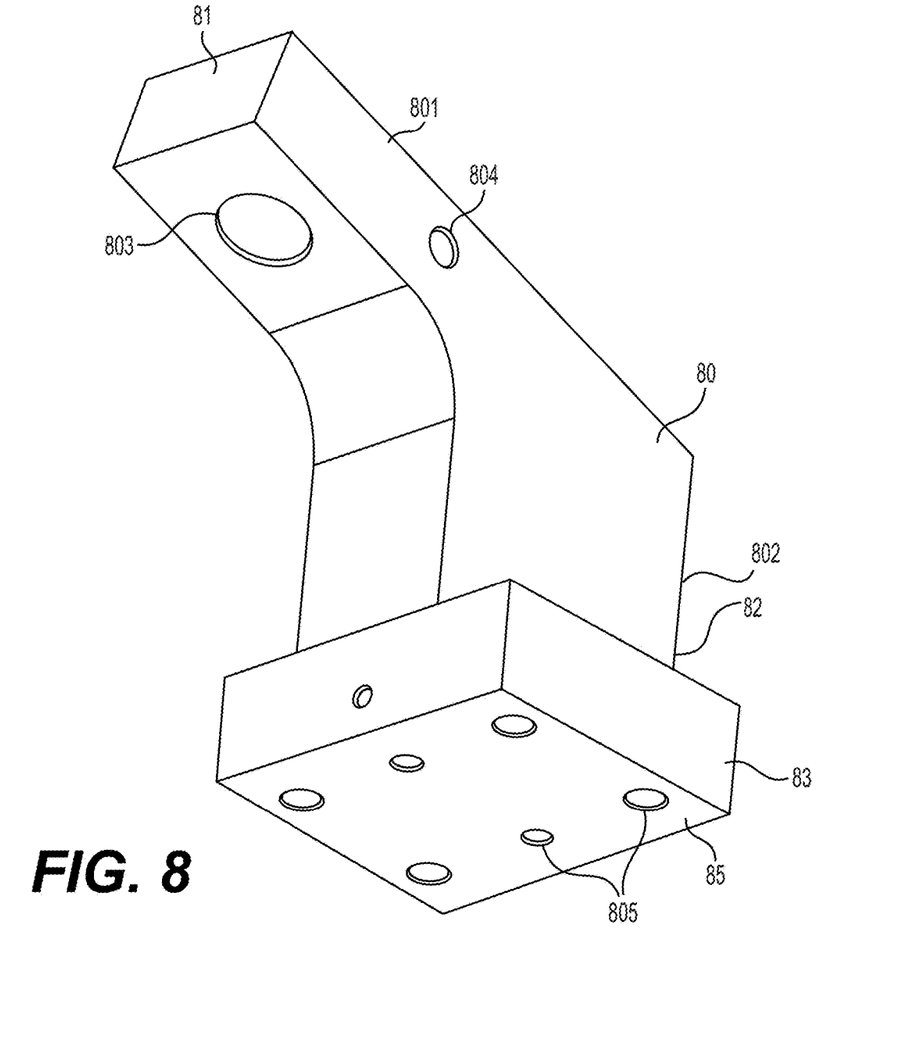
FIG. 8 is a view of an alternative cam jig.

A cam jig 80 can comprise a cam arm 801. An optional cam jig base 83 can be included with the cam jig 80 as shown in FIG. 8. Or a one-piece cam jig 80 can be formed as in FIG. 1A. A base end 82, 821 can comprise dowel ports 805 in the bottom surface 85 to permit serviceability and alternate installations. Cam jig body 802 can connect to cam arm 801. A cam pin 50 can be mounted in a pin port 803 in cam pin end 81 of the cam arm 801. A pivot port 804 can be included for mounting a handle 60 to the cam arm 801.

A rocker arm 20 can be removably mounted to the rocker arm jig 90, 93. The rocker arm 20 can comprise a radius R on a bearing surface 30. A cam edge 53 of the cam pin 50 can press against the bearing surface 30. Cam pin 50 can comprise a sliding body 59 that slides within sleeve 66. Sleeve 66 can be replaced as needed. Rim 56 of cam pin 50 can be restricted in motion by sleeve 66. Upper pin 51 can terminate with tip 57. Tip 57 can optionally be stayed by a guide arm 70.

At least one measuring device can comprise a KEYENCE laser measurement device. One or more measuring device 41, 42 can comprise a wavelength emitting device such as a laser array paired with a wavelength detecting device such as a detector array. A lens 43 can protect the laser array and detector array. Light can be emitted toward the rocker jig 90, 93 and rocker arm 20. Reflected light can be detected by the detector array. Processing within the KEYENCE laser measurement device and or within an electronic control unit ECU connected to the laser measurement device 41, 42 yield a measurement of the radius R of the bearing surface with respect to the pivot peg 910. Processing collected data yields the first distance X, second distance Y, and valve lift expected for the rocker arm 20. Sorting can be done accordingly.

As an alternative, the above rocker arm grading system 1 and grading tool 10 can further comprise a weight 77 affixed to the upper pin 51 of cam pin 50 to press the cam edge 53 towards the pivot peg 910 and the valve peg 901. With the rocker arm 20 installed, the weight can press the bearing surface as an overhead cam would press during engine operation. This provides a reliable result. Any jiggle caused by clearances is pressed by the weight yielding a more accurate calculation of the bearing point BP. In the case of a dual arm rocker arm, if one arm is biased relative to the other arm, the pressure can push the dual arms to a predetermined configuration that can be consistently measured to yield the bearing point BP, valve lift determination, and grade determination.

As an alternative means to provide pressure on the cam pin 50, the above rocker arm grading system 2 and grading tool 11 can further comprise a rim 56 positioned above the cam arm 801 on the cam pin 50. A guide arm 70 can be configured to guide the upper pin 51 of cam pin 50. The guide arm 70 can comprise a biasing surface 701. A guide hole 75 in the biasing surface can receive the tip 57 of cam pin 50. A spring 52 can be biased between the biasing surface 701 and the rim 56 to press the cam edge 53 towards the pivot peg 911 and the valve peg 901. A mounting end 702 of the guide arm 70 can be attached to cam arm 801.

As an alternative, the above rocker arm grading system 1, 2 and grading tool 10, 11 can further comprise a handle 60 configured to move the cam pin 50. A user can manually lift the cam pin 50 or a machine can automate the motion. A paddle 602 is shown as an example. Handle 60 can be anchored at pivot port 804 and a pair of curved bars 601 can be actuated to lift cam pin 50 by rim 56.

As an alternative, the above rocker arm grading system 1, 2 and grading tool 10, 11 can further comprise a reference peg 920 installed in the rocker arm jig 90, 93 between the pivot peg 910 and the valve peg 901.

Figure 5:
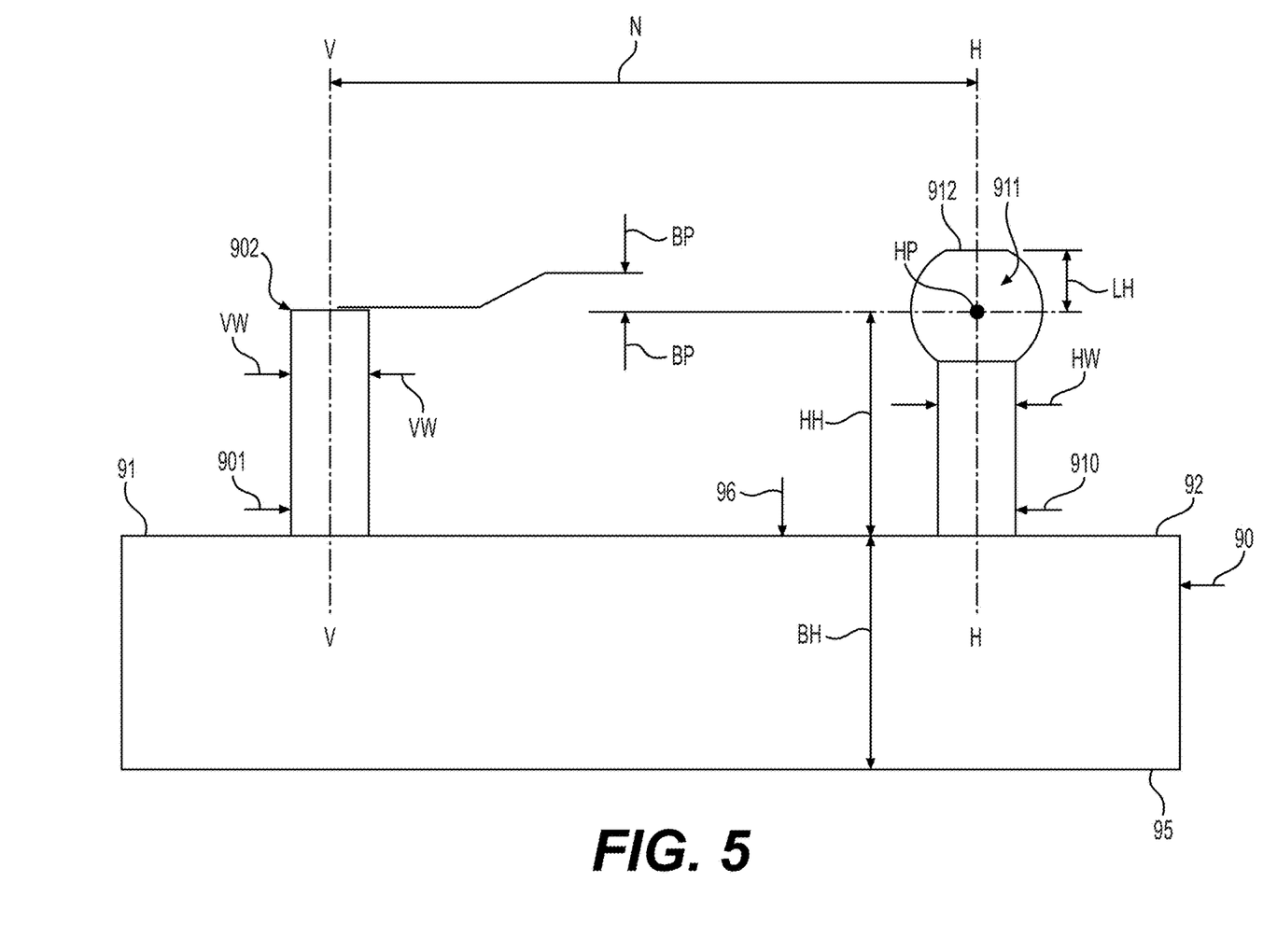
FIG. 5 is a view of an alternative rocker arm jig.
Figure 6:
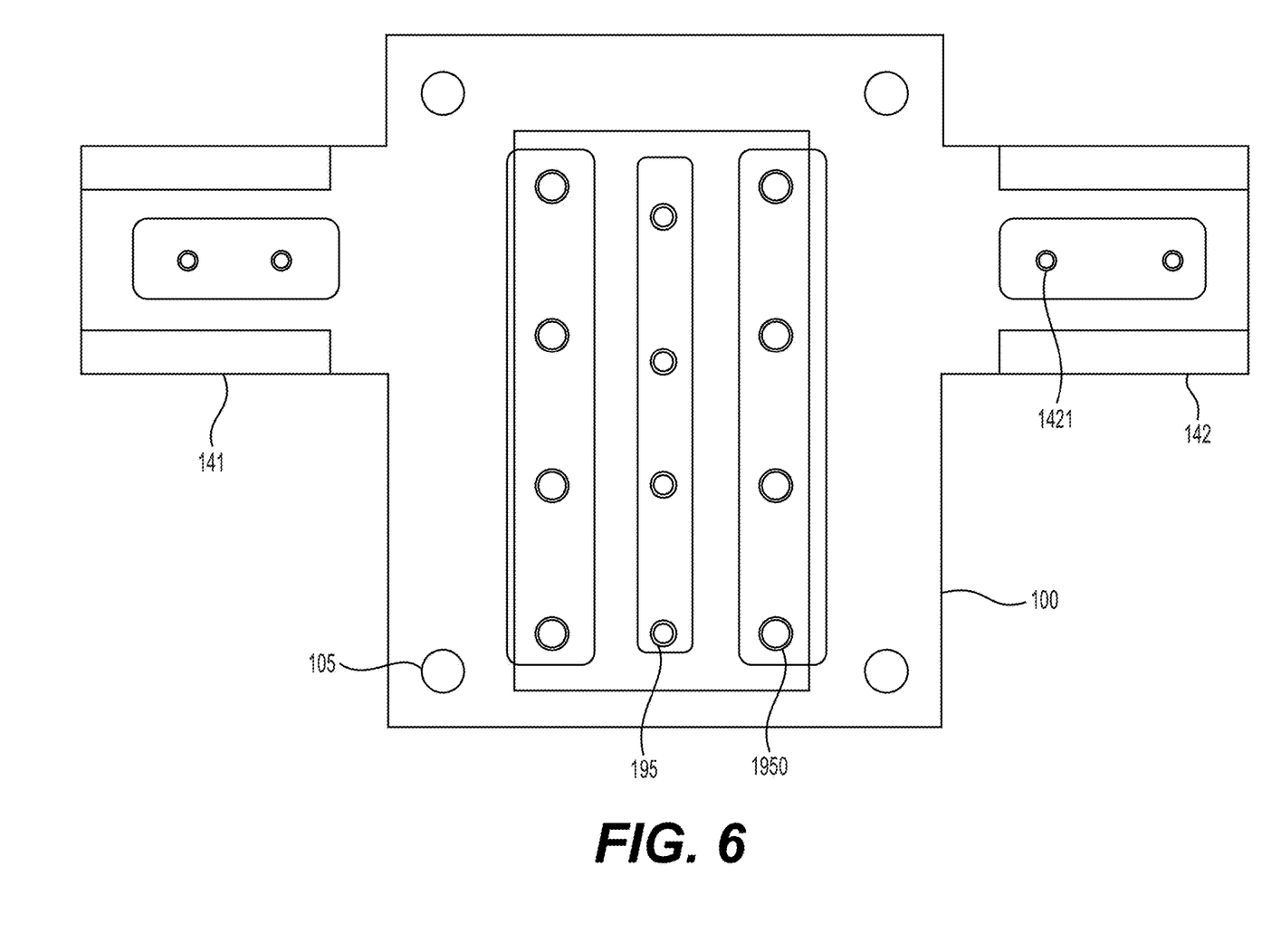
FIG. 6 is a view of a base of a rocker arm jig.
Figure 7A:
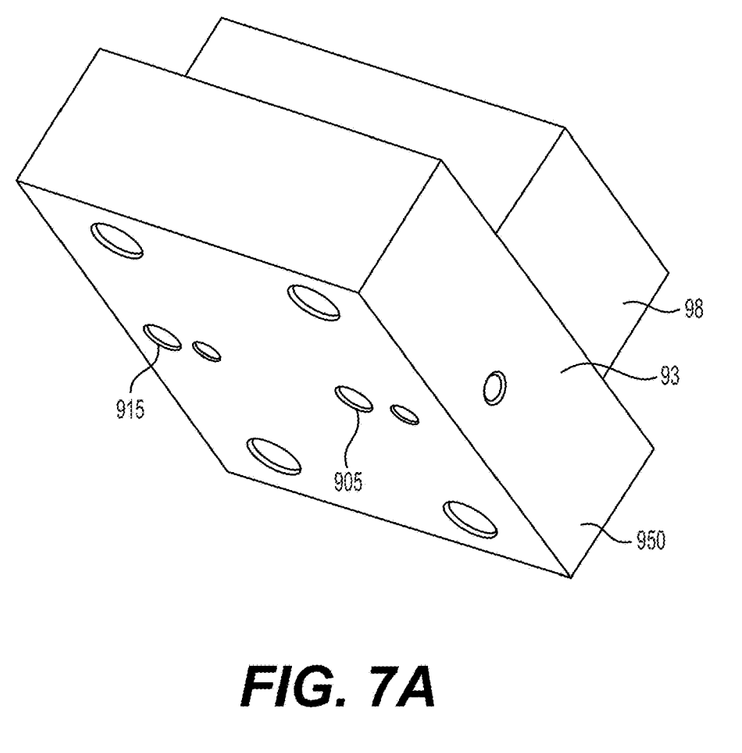
FIGS. 7A & 7B are views of an alternative rocker arm jig.
Figure 7B:
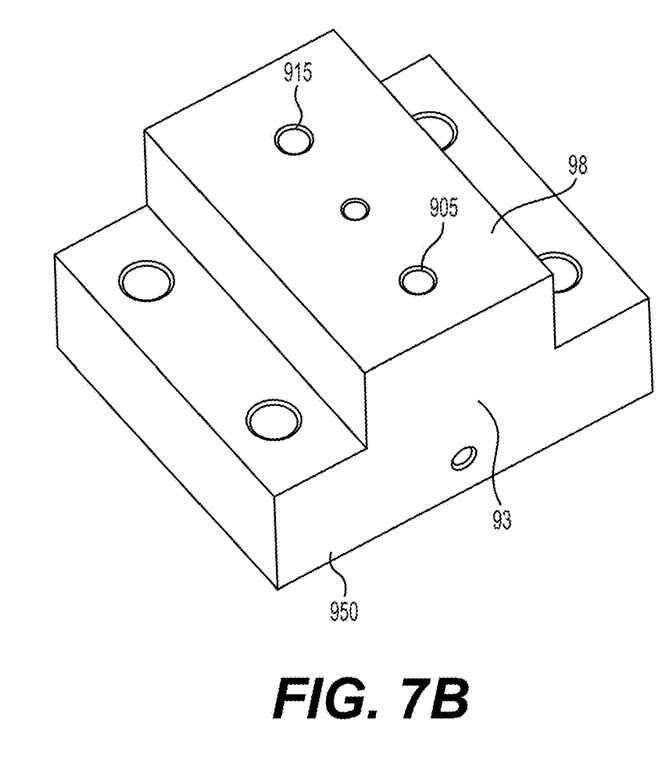

Several alternatives for jigging the grading tools 10, 11 and rocker arm grading system 1, 2 can be seen. In FIG. 5, a block is shown for rocker arm jig 90. A pivot end 92 and valve end 91 can be oriented relative to the measuring devices 41, 42 by aligning datums in the base 95. Base height BH can be selected so that rocker arm 20 receives pressure from cam pin 50 at the correct trajectory and rate. In FIG. 1A, the base height BH differs for rocker arm jig 93, and the datums can be seen aligned with dowels 1951 in base jig 100.

Base jig 100 is shown in FIG. 1B with measuring device jigs 141, 142. Rocker arm jig 93 can comprise sections. An upper section 98 can be similarly constructed as rocker arm jig 90. A lower section 950 can provide datums for alignment such as dowel holes or tapping holes. Base jig 100 can comprise corresponding datums 1421, 1950, 195, 105 for alignment of the measurement devices, rocker arm jigs, cam jig, and optionally the pivot peg and valve peg.

Figure 9:
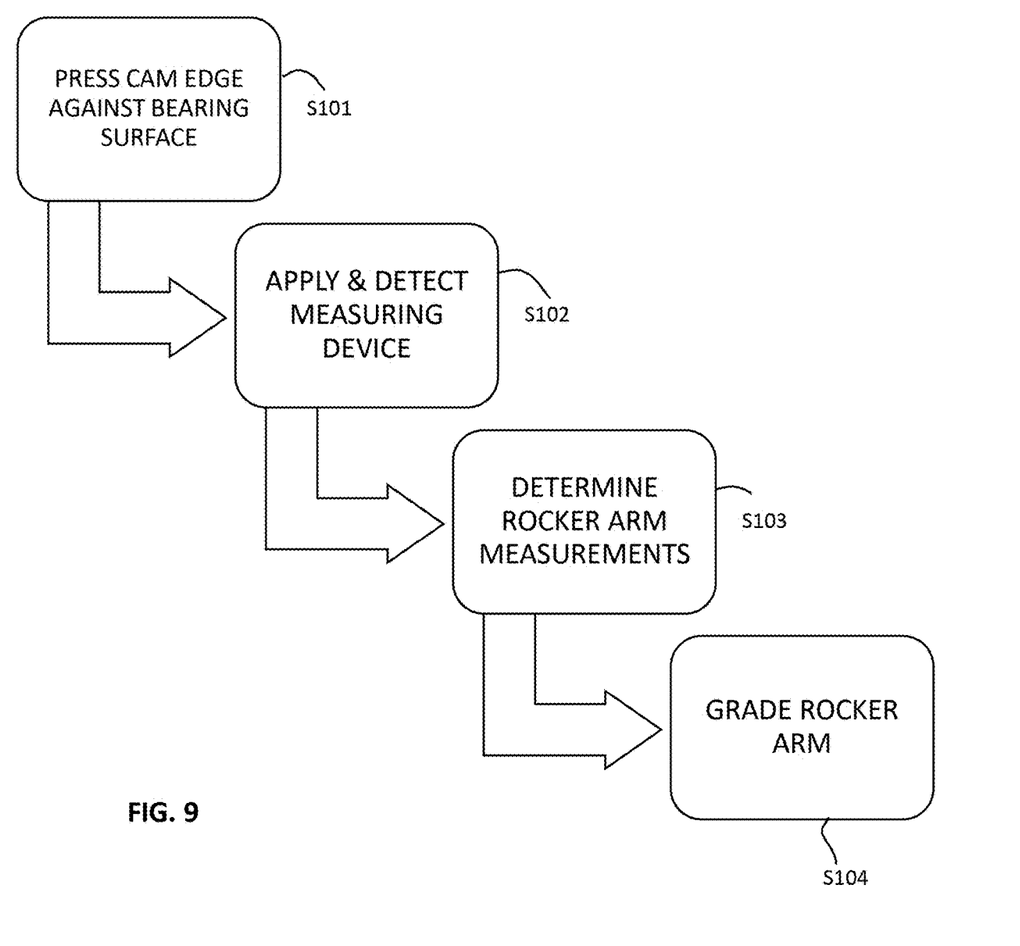
FIG. 9 is a flow diagram of a method of grading a rocker arm.

Turning to FIG. 9, a method of grading a rocker arm can be seen. In step S101, it is possible to press a cam edge 53 of a cam pin 50 against a bearing surface 30 of a rocker arm 20. The pressure can mimic the pressure applied by an overhead cam during engine operation. The pressure can put the rocker arm components in a predetermined position for reliable measurement, as discussed above. The pressure can come from the weight or spring or the like.

In step S102, it is possible to apply an emitted wavelength of at least one measuring device 41, 42 to the rocker arm 20 and to the rocker arm jig 90, 93 comprising the pivot peg 910 and a valve peg 901. In the case of a KEYENCE device, the measuring device is devised to detect the applied emitted wavelength to collect profile data of the rocker arm 20. The detection can be done by a detector tuned to the wavelength applied. A reflection of the wavelength off of the rocker arm 20 can be detected so that an emitter and detector are installed on one or both sides of the jig. Or, one side of the jig holds an emitter while the opposite side of the jig holds a detector.

Step S102 can alternatively comprise applying the emitted wavelength of the at least one measuring device 41 to a first side of the rocker arm 20 and to the rocker arm jig 90, 93 comprising the pivot peg 910 and the valve peg 90. A second emitted wavelength of a second measuring device 42 can be applied to a second side of the rocker arm 20 and to the rocker arm jig 90, 3 comprising the pivot peg 910 and the valve peg 901. Then, it can be possible to detect the applied emitted wavelength and the second emitted wavelength to collect the profile data of the rocker arm. The collected profile data can be processed to determine measurements of the first side of the rocker arm and of the second side of the rocker arm. For example, the location of an axle hole 25 of a roller bearing can be found for both sides of the rocker arm 20. The rocker arm 20 can be graded based on a location match or mismatch found by comparing a first location of a first axle hole of the first side of the rocker arm to a second location of a second axle hole on the second side of the rocker arm.

In step S103, ECU can process the collected profile data to determine measurements of the rocker arm 20. The first distance X, the second distance Y, and the radius R are each measurements that can be determined, among others such as bearing point BP. ECU can process the collected profile data to determine a position of the bearing surface 30 relative to the pivot peg 910. In the case of a rocker arm comprising a roller bearing on an axle, processing the collected profile data can comprise determining a radius measurement of the roller bearing. The location of the axle in the rocker arm can be determined from the radius measurement of the roller bearing.

In step S104, the rocker arm 20 can be graded according to the determined measurements. It can be possible to correlate the grade of the rocker arm to a valve lift.

It is possible to iterate the steps S102, S103 to collect multiple sets of profile data and measurements.

Other implementations will be apparent to those skilled in the art from consideration of the specification and practice of the examples disclosed herein.

What is claimed is:

1. A grading tool for measuring a rocker arm, comprising:
a rocker arm jig comprising a pivot peg and a valve peg;

a cam jig comprising a cam arm;
a cam pin mounted in the cam arm, the cam pin comprising a cam edge for pressing a rocker arm towards the pivot peg and the valve peg; and
at least one measuring device comprising a wavelength emitting device paired with a wavelength detecting device, the measuring device configured to measure a profile of the rocker arm with respect to the pivot peg.

2. The grading tool for measuring a rocker arm of claim 1, comprising a weight affixed to the cam pin to press the cam edge towards the pivot peg and the valve peg.

3. The grading tool for measuring a rocker arm of claim 1, comprising:
the cam pin mounted in the cam arm, the cam pin comprising:
a rim positioned above the cam arm; and
the cam edge for pressing the rocker arm towards the pivot peg and the valve peg;
a guide arm configured to guide the cam pin, the guide arm comprising a biasing surface; and
a spring biased between the biasing surface and the rim, the spring configured to press the cam edge towards the pivot peg and the valve peg.

4. The grading tool of claim 3, characterized by further comprising a handle configured to move the cam pin.

5. The grading tool for measuring a rocker arm of claim 1, wherein the at least one measuring device comprises:
a first measuring device comprising a first wavelength emitting device paired with a first wavelength detecting device, the first measuring device configured to measure a first profile of the rocker arm with respect to the pivot peg; and
a second measuring device mounted on an opposite side of the rocker arm jig, the second measuring device comprising a second wavelength emitting device paired with a second wavelength detecting device, the second measuring device configured to measure a second profile of the rocker arm with respect to the pivot peg.

6. The grading tool for measuring a rocker arm of claim 1, further comprising a reference peg between the pivot peg and the valve peg.

7. A rocker arm grading system, comprising:
a rocker arm jig comprising a pivot peg and a valve peg;
a rocker arm removably mounted to the rocker arm jig, the rocker arm comprising a radius on a bearing surface;
a cam jig comprising a cam arm;
a cam pin mounted in the cam arm, the cam pin comprising a cam edge for pressing against the bearing surface; and
at least one measuring device comprising a wavelength emitting device paired with a wavelength detecting device, the measuring device configured to measure the radius of the bearing surface with respect to the pivot peg.

8. The rocker arm grading system of claim 7, comprising a weight affixed to the cam pin to press the cam edge towards bearing surface.

9. The rocker arm grading system of claim 7, comprising:
the cam pin mounted in the cam arm, the cam pin comprising:
a rim positioned above the cam arm; and
the cam edge for pressing against the bearing surface;
a guide arm configured to guide the cam pin, the guide arm comprising a biasing surface; and
a spring biased between the biasing surface and the rim, the spring configured to press the cam edge towards the pivot peg and the valve peg.

10. The rocker arm grading system of claim 9, characterized by further comprising a handle configured to move the cam pin.

11. The rocker arm grading system of claim 7, wherein the at least one measuring device comprises:
a first measuring device comprising a first wavelength emitting device paired with a first wavelength detecting device, the first measuring device configured to measure the radius of the bearing surface with respect to the pivot peg; and
a second measuring device mounted on an opposite side of the rocker arm jig, the second measuring device comprising a second wavelength emitting device paired with a second wavelength detecting device, the second measuring device configured to measure the radius of the bearing surface with respect to the pivot peg.

12. The rocker arm grading system of claim 7, further comprising a reference peg between the pivot peg and the valve peg.

13. The rocker arm grading system of claim 1, wherein the bearing surface is a roller bearing, and the roller bearing is mounted on an axle.

14. A method of grading a rocker arm, comprising:
pressing a cam edge of a cam pin against a bearing surface of a rocker arm;
applying an emitted wavelength of at least one measuring device to the rocker arm and to a rocker arm jig comprising a pivot peg and a valve peg;
detecting the applied emitted wavelength to collect profile data of the rocker arm;
processing the collected profile data to determine measurements of the rocker arm; and
grading the rocker arm according to the determined measurements.

15. The method of claim 14, further comprising processing the collected profile data to determine a position of the bearing surface relative to the pivot peg.

16. The method of claim 14, wherein the rocker arm comprises a roller bearing on an axle, and wherein processing the collected profile data comprises determining a radius measurement of the roller bearing.

17. The method of claim 16, further comprising determining the location of the axle in the rocker arm from the radius measurement of the roller bearing.

18. The method of claim 14, comprising:
applying the emitted wavelength of the at least one measuring device to a first side of the rocker arm and to the rocker arm jig comprising the pivot peg and the valve peg; and
applying a second emitted wavelength of a second measuring device to a second side of the rocker arm and to the rocker arm jig comprising the pivot peg and the valve peg;
detecting the applied emitted wavelength and the second emitted wavelength to collect the profile data of the rocker arm; and
processing the collected profile data to determine measurements of the first side of the rocker arm and of the second side of the rocker arm.

19. The method of claim 18, further comprising: grading the rocker arm after comparing a first location of a first axle hole of the first side of the rocker arm to a second location of a second axle hole on the second side of the rocker arm.

20. The method of claim 14, further comprising correlating the grade of the rocker arm to a valve lift.

* * * * *